(12) United States Patent
Saito et al.

(10) Patent No.: US 10,785,455 B2
(45) Date of Patent: Sep. 22, 2020

(54) PLANT OPERATING STATE ANALYSIS SYSTEM

(71) Applicant: TOSHIBA MITSUBISHI-ELECTRIC INDUSTRIAL SYSTEMS CORPORATION, Chuo-ku (JP)

(72) Inventors: Shotaro Saito, Tokyo (JP); Hiroyuki Fujieda, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 0 days.

(21) Appl. No.: 16/493,021

(22) PCT Filed: May 15, 2017

(86) PCT No.: PCT/JP2017/018221
§ 371 (c)(1),
(2) Date: Sep. 11, 2019

(87) PCT Pub. No.: WO2018/211564
PCT Pub. Date: Nov. 22, 2018

(65) Prior Publication Data
US 2020/0068177 A1 Feb. 27, 2020

(51) Int. Cl.
*H04N 7/18* (2006.01)
*G05B 19/042* (2006.01)
(Continued)

(52) U.S. Cl.
CPC ........... *H04N 7/183* (2013.01); *G05B 19/042* (2013.01); *H04N 5/04* (2013.01); *H04N 7/08* (2013.01); *G05B 2219/25428* (2013.01)

(58) Field of Classification Search
CPC . H04N 7/183; H04N 5/04; H04N 7/08; G05B 19/042; G05B 2219/25428;
(Continued)

(56) References Cited

U.S. PATENT DOCUMENTS

| 7,486,308 B1* | 2/2009 | Kori | H04L 12/40071 348/143 |
| 2010/0138745 A1* | 6/2010 | McNamara | G06Q 10/06 715/720 |
| 2011/0149072 A1* | 6/2011 | McCormack | G08B 13/1963 348/143 |

FOREIGN PATENT DOCUMENTS

| JP | 5-34181 A | 2/1993 |
| JP | 2001-84032 A | 3/2001 |

(Continued)

OTHER PUBLICATIONS

Translation of International Preliminary Report on Patentability and Written Opinion dated Dec. 10, 2019 in International Application No. PCT/JP2017/018221.

(Continued)

*Primary Examiner* — Tung T Vo
(74) *Attorney, Agent, or Firm* — Xsensus LLP (57) ABSTRACT

A plant operating state analysis system includes a data collector which is connected to both a control network and a monitoring network and which collects both control network data and monitoring screen video data. The data collector includes a synchronization processing unit and a data display processing unit. The synchronization processing unit synchronizes the control network data and the monitoring screen video data by adding a delay time due to transmission through the monitoring network, which includes an encoding time spent by a video capturer, to the time at which the control network data has been collected. The data display processing unit reproduces and displays, on a screen, the control network data and monitoring screen video data that are synchronized by the synchronization processing unit.

7 Claims, 8 Drawing Sheets

(51) Int. Cl.
*H04N 5/04* (2006.01)
*H04N 7/08* (2006.01)

(58) Field of Classification Search
CPC .......... G05B 23/02; G01D 21/00; G06F 3/14; G06F 11/34
USPC ...................................... 348/169; 375/240.12
See application file for complete search history.

(56) References Cited

FOREIGN PATENT DOCUMENTS

| | | |
|---|---|---|
| JP | 2004-139488 A | 5/2004 |
| JP | 2005-57590 A | 3/2005 |
| JP | 2015-114827 A | 6/2015 |

OTHER PUBLICATIONS

Office Action dated Oct. 1, 2019 in Japanese Patent Application No. 2019-518615, 8 pages (with unedited computer generated English translation).
International Search Report dated Aug. 1, 2017 in PCT/JP2017/018221 filed on May 15, 2017.

* cited by examiner

PLANT OPERATING STATE ANALYSIS SYSTEM

FIELD

The present invention relates to a plant operating state analysis system.

BACKGROUND

A plant includes a field device (including an actuator and a sensor) constituting the plant and a control PLC (Programmable Logic Controller) for controlling the field device. The control PLC receives input of a feedback signal from the field device and outputs a control signal for controlling the field device. The field device operates according to the control signal. An input/output signal (control network data) of the control PLC is collected by a data collector.

The operating condition of the field device and the operating condition of a mechanical facility including the field device are photographed by cameras in some cases. For example, in PTL 1, a plant monitoring system that includes monitor camera for photographing the operating condition of a mechanical facility and can store video information obtained from the monitor camera is disclosed.

Monitoring of the entire plant facility is performed by a monitor. A plant operating state, which includes the positional information of materials, the operation state of an operator, and mechanical information such as a mechanical speed and position, is displayed in summary on a monitoring screen of the monitor. The operator performs operation according to both screen information on the monitor and visual confirmation.

CITATION LIST

Patent Literature

[PTL 1]
JP H5-34181A

SUMMARY

Technical Problem

A monitoring network to which the monitor is connected and a control network to which the field device, control PLC, and data collector are connected are different networks. Therefore, a conventional data collector can collect control network data but cannot collect screen information on the monitor. Thus, when an abnormality factor is analyzed in the data collector, it is necessary to determine the plant operating state, which includes the positional information of materials, the operation state of an operator, and mechanical information such as a mechanical speed and position, from the control network data. Every time an abnormality occurs, a person checks necessary control network data in detail, and this has a possibility of failing to obtain correct information. Further, it requires a long time to perform an operation of analyzing an abnormality factor.

In addition, in the conventional data collector, even when video data captured by photographing the operating condition of a mechanical facility by a camera is collected, the mechanical operation in a range which is not photographed by the camera cannot be checked. Therefore, it cannot be said that it is sufficient as a recording state of information at the time of abnormality occurrence and mechanical adjustment.

The present invention has been made so as to solve the above-described problems, and it is an object of the present invention to provide a plant operating state analysis system that can support analysis of the plant operating state in a data collector by synchronously displaying both control network data and screen information on a monitor.

Solution to Problem

To achieve the above object, a plant operating state analysis system according to the embodiment of the present disclosure is configured as follows.

The plant operating state analysis system includes, at least, a controller, a control network, a monitor, a video capturer, a monitoring network, and a data collector.

The controller controls a field device constituting a plant. The field device includes an actuator and a sensor. The controller is, for example, a control PLC.

The control network is connected to the controller and transmits control network data which is input/output to/from the controller. The control network data includes a feedback signal output by the field device and a control signal output by the controller.

The monitor has a monitoring screen and displays operating information for the entire plant facility other than the control network data, on the monitoring screen. The operating information includes plant operating-related information including: the operation state of an operator; and mechanical information such as a mechanical speed and position.

The video capturer is connected to the monitor and outputs monitoring screen video data obtained by encoding video displayed on the monitoring screen.

The monitoring network is connected to the video capturer and transmits the monitoring screen video data.

The data collector is connected to both the control network and monitoring network and collects both the control network data and monitoring screen video data. The data collector includes a synchronization processing unit and a data display processing unit.

The synchronization processing unit synchronizes the control network data and monitoring screen video data by adding a delay time due to transmission through the monitoring network, which includes an encoding time spent by the video capturer, to a time at which the control network data has been collected.

The data display processing unit reproduces and displays, on a screen, the control network data and monitoring screen video data that are synchronized by the synchronization processing unit.

Preferably, the plant operating state analysis system further includes a network camera. The network camera is connected to the monitoring network and photographs the appearance of the field device and outputs field device video data. The synchronization processing unit synchronizes the control network data, monitoring screen video data, and field device video data. The data display processing unit reproduces and displays, on a screen, the control network data, monitoring screen video data, and field device video data that are synchronized by the synchronization processing unit.

In addition, the plant operating state analysis system according to another embodiment of the present disclosure includes, instead of the video capturer described above, a vide capturer that outputs monitoring screen video data, which is obtained by encoding video displayed on a monitoring screen, with the input time at which the video has been input added. Further, the plant operating state analysis system includes, instead of the synchronization processing unit described above, a synchronization processing unit that synchronizes the control network data and the monitoring screen video data by associating both the data pieces with each other so as to match the time at which the control network data has been collected and the input time which has been added to the monitoring screen video data.

Advantageous Effects of Invention

According to an embodiment of the present disclosure, in the data collector, the control network data relating to control of the field device constituting the plant and the monitoring screen video data including operating information for the entire plant facility other than the control network data can be synchronously reproduced. This data collector allows analysis of the operating state of the plant to be supported. In the data collector, the operating state of the plant can be easily grasped and accordingly, the speed of analyzing an abnormality factor is improved; thereby, a recovery time at the time of abnormality occurrence can be reduced. Due to a reduction in the recovery time, a reduction in labor costs relating to trouble settlement and an increase in production volume can be expected.

DESCRIPTION OF EMBODIMENTS

Hereinafter, the embodiments of the present disclosure will be described in detail with reference to drawings. It is noted that common elements in the drawings are denoted by the same reference signs, thereby omitting redundant descriptions thereof.

First Embodiment

System Configuration

Figure 1:
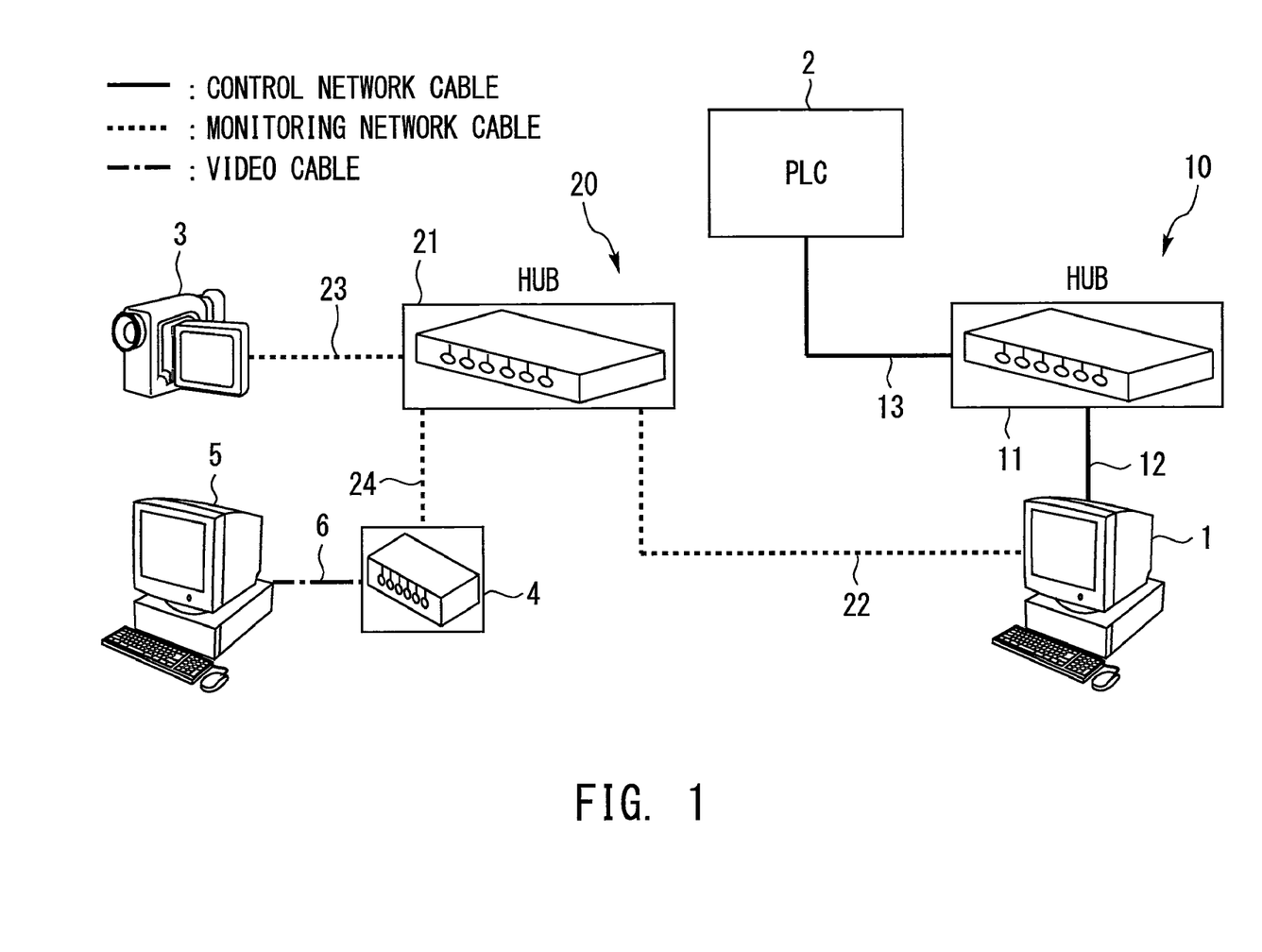
FIG. 1 is a system configuration diagram of a plant operating state analysis system according to the first embodiment of the present disclosure.

FIG. 1 is a system configuration diagram of a plant operating state analysis system according to the first embodiment of the present disclosure.

The plant operating state analysis system includes a data collector 1, a control PLC 2, a network camera 3, a video capturer 4, a monitor 5, a control network 10, and a monitoring network 20.

The data collector 1 is connected to both the control network 10 and the monitoring network 20. The data collector 1 is connected to the control PLC 2 via the control network 10. The data collector 1 is connected to the network camera 3 and video capturer 4 via the monitoring network 20. The video capturer 4 is connected to the monitor 5.

The control network 10 is constituted of a plurality of network devices. In the example in FIG. 1, the control network cables 12 and 13 are connected to the control network line concentration device 11. The control network cable 12 is connected to the data collector 1. The control network cable 13 is connected to the control PLC 2. That is, in the example in FIG. 1, the data collector 1 is connected to the control PLC 2 via the control network cable 12, the control network line concentration device 11, and the control network cable 13.

The monitoring network 20 is constituted of a plurality of network devices. In the example in FIG. 1, the monitoring network cables 22 to 24 are connected to the monitoring network line concentration device 21. The monitoring network cable 22 is connected to the data collector 1. The monitoring network cable 23 is connected to the network camera 3. The monitoring network cable 24 is connected to the video capturer 4. That is, in the example in FIG. 1, the data collector 1 is connected to the network camera 3 via the monitoring network cable 22, the monitoring network line concentration device 21, and the monitoring network cable 23. In addition, the data collector 1 is connected to the video capturer 4 via the monitoring network cable 22, the monitoring network line concentration device 21, and the monitoring network cable 24. The video capturer 4 is connected to the monitor 5 by a video cable 6 (for example, HDMI® cable).

The control PLC 2 is a controller that controls a field device (not shown) constituting a plant. The field device is connected to the control network 10. The field device includes an actuator and a sensor. The control PLC 2 receives input of a feedback signal which is output to the control network 10 by the field device; and outputs a control signal for controlling the field device to the control network 10. The field device operates based on the control signal.

The control network 10 transmits control network data which is input/output to/from the control PLC 2. The control network data includes a feedback signal that is output by the field device and a control signal that is output by the controller.

The network camera 3 photographs the appearance of the field device that is a control object of the control PLC 2. The network camera 3 sequentially outputs the video data of the photographed field device (field device video data) to the monitoring network 20 (for example, in units of one frame). The monitoring network 20 transmits the field device video data which is output from the network camera 3, to the data collector 1.

The monitor 5 has a monitoring screen and displays operating information for the entire plant facility other than the control network data, on the monitoring screen. The operating information includes plant operating-related information (the positional information of materials, the operation state of an operator, the mechanical speed and position, operating schedule, etc.) which cannot be obtained from the control network 10. Part or summarized information of the control network data can also be displayed.

The video capturer 4 sequentially outputs monitoring screen video data which is obtained by encoding video displayed on the monitoring screen of the monitor 5 to the monitoring network 20 (for example, in units of one frame).

The monitoring network 20 transmits the monitoring screen video data which is output from the video capturer 4, to the data collector 1. The transmission speed of the monitoring network 20 is lower than the transmission speed of the control network 10.

Data Collector

The data collector 1 is connected to both the control network and monitoring network and sequentially collects the control network data from the control network 10, and the field device video data and monitoring screen video data from the monitoring network 20. The data collector 1 synchronously displays the data pieces collected from the different networks on a data confirmation screen. Therefore, in a case where, for example, an abnormality occurs, analysis of the plant operating state can be supported in the data collector that is closer to a worksite than the monitor.

Configuration of Data Confirmation Screen

Figure 2:
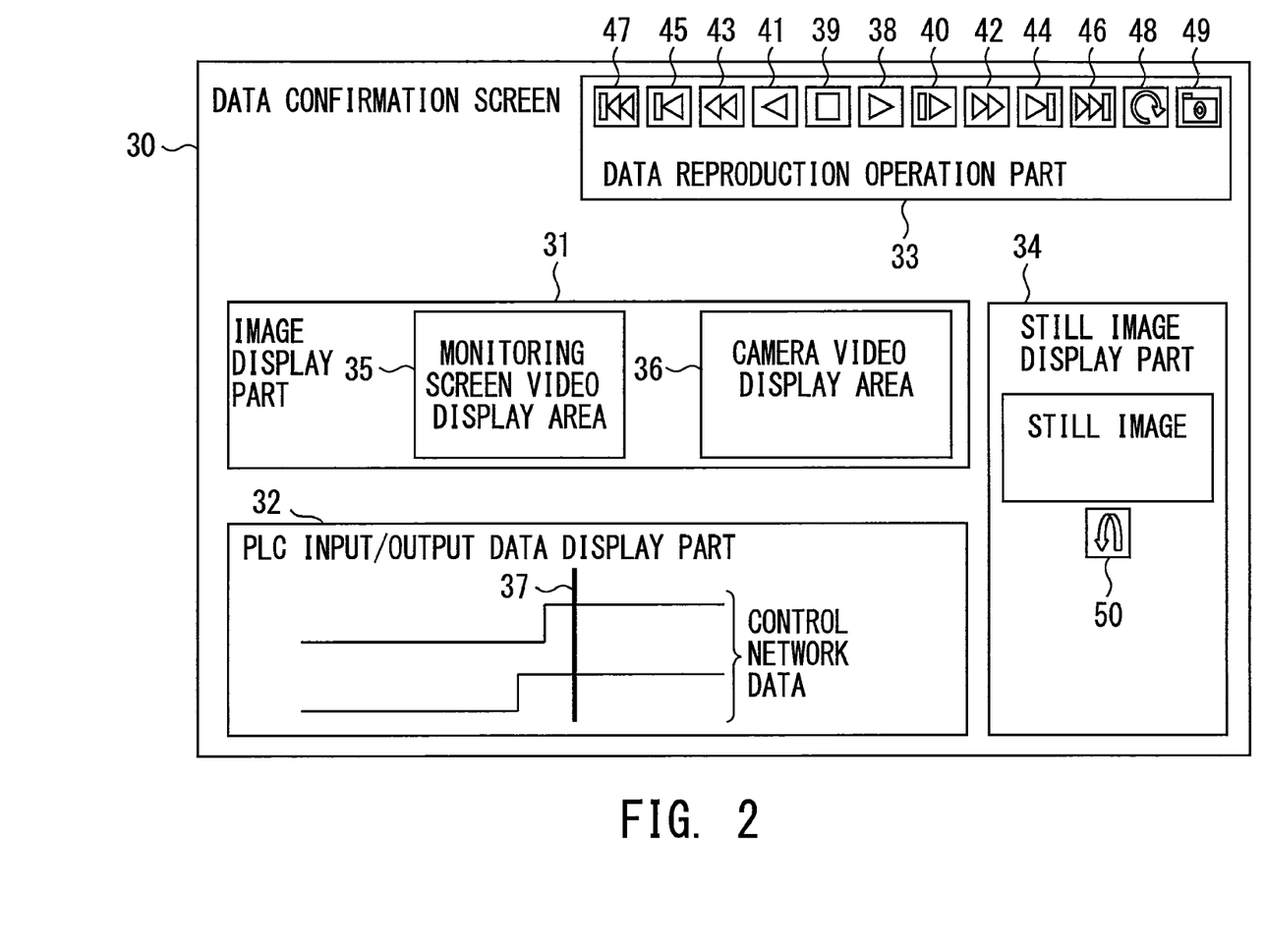
FIG. 2 is a configuration diagram of a data confirmation screen in a data collector.

FIG. 2 is a configuration diagram of a data confirmation screen 30 in the data collector 1. The data confirmation screen 30 of the data collector 1 includes an image display part 31, a PLC input/output data display part 32, a data reproduction operation part 33, and a still image display part 34.

The image display part 31 includes a monitoring screen video display area 35 and a camera video display area 36. In the monitoring screen video display area 35, the monitoring screen video data collected from the video capturer 4 is displayed. In the camera video display area 36, the field device video data collected from the network camera 3 is displayed. Through these displays, operating information and field device appearance information can be checked.

In the PLC input/output data display part 32, the control network data collected from the control network 10 is displayed in a time-series graph. In addition, in the PLC input/output data display part 32, a reproduction position indicator 37 indicating a current reproduction position on the time axis of the time-series graph is displayed. The reproduction position indicator 37 indicates the reproduction position of: the monitoring screen video data displayed in the monitoring screen video display area 35; and the field device video data displayed in the camera video display area 36. The reproduction position indicator 37 also indicates a current reproduction position when each button on the data reproduction operation part 33 functions.

The data reproduction operation part 33 includes a reproduction button 38, a stop button 39, a slow reproduction button 40, a reverse reproduction button 41, a fast forward button 42, a fast reverse button 43, a frame feed button 44, a frame return button 45, an end display button 46, a head display button 47, a continuous reproduction button 48, and a still image capture button 49.

The reproduction button 38 is a button for starting both the movement of the reproduction position indicator 37 and the reproduction of video data in the image display part 31, from a position indicated by the reproduction position indicator 37.

The stop button 39 is a button for stopping the reproduction of the image display part 31 when video data is being reproduced in the image display part 31 by the reproduction button 38, slow reproduction button 40, reverse reproduction button 41, fast forward button 42, or fast reverse button 43.

The slow reproduction button 40 is a button for starting both the movement of the reproduction position indicator 37 and the slow reproduction of video data in the image display part 31, from a position indicated by the reproduction position indicator 37.

The reverse reproduction button 41 is a button for starting both the movement of the reproduction position indicator 37 and the reverse reproduction of video data in the image display part 31, from a position indicated by the reproduction position indicator 37.

The fast forward button 42 is a button for starting both the movement of the reproduction position indicator 37 and the fast forward reproduction of video data in the image display part 31, from a position indicated by the reproduction position indicator 37.

The fast reverse button 43 is a button for starting both the movement of the reproduction position indicator 37 and the fast reverse reproduction of video data in the image display part 31, from a position indicated by the reproduction position indicator 37.

The frame feed button 44 is a button for performing both the movement of the reproduction position indicator 37 and the frame feeding of video data in the image display part 31, from a position indicated by the reproduction position indicator 37. In frame feeding, one frame time, which depends on the frame rate of a camera, is, for example, 33.33 msec with a camera having a frame rate of 30 fps and data being displayed can be changed at every 33.33 msec.

The frame return button 45 is a button for performing both the movement of the reproduction position indicator 37 and the frame return of video data in the image display part 31, from a position indicated by the reproduction position indicator 37. Description of the frame rate is omitted since it is the same as the description of the frame feed button 44.

The end display button 46 is a button for moving the reproduction position indicator 37 from the current reproduction position to the reproduction position for the end of the control network data and displaying the end of video data in the image display part 31.

The head display button 47 is a button for moving the reproduction position indicator 37 from the current reproduction position to the reproduction position for the head of the control network data and displaying the head of video data in the image display part 31.

The continuous reproduction button 48 is a button for: automatically moving, when the reproduction position indicator 37 has moved to the end of data, the reproduction position indicator 37 to the head of the control network data; and restarting the movement of the reproduction position indicator 37 and the reproduction of video data in the image display part 31 from the head of the control network data.

The still image capture button 49 is a button for creating a still image from video data being displayed in the image display part 31 at a current reproduction position indicated by the reproduction position indicator 37.

The still image display part 34 displays a still image which is created when the still image capture button 49 is pressed. The still image display part 34 includes a redisplay button 50 for a still image creation position. The redisplay button 50 for a still image creation position is a button for: moving the reproduction position indicator 37 to a reproduction position at the time of creating a still image; and displaying, in the image display part 31, video data at the time of creating the still image.

Hardware Configuration of Data Collector

Figure 3:
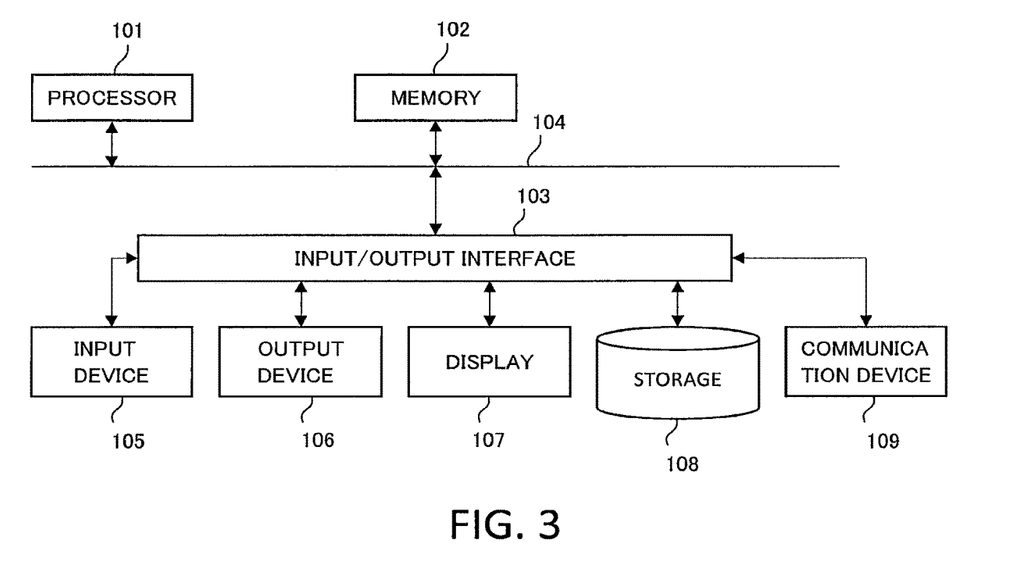
FIG. 3 is a block diagram showing a hardware configuration example of a processing circuit included in the data collector.

FIG. 3 is a block diagram showing a hardware configuration example of a processing circuit included in the data collector 1. Each unit shown in FIGS. 4 to 6, which is described later, represents part of functions included in the data collector 1 and each of the functions is implemented by a processing circuit. For example, the processing circuit is a computer including a processor 101, a memory 102, an input/output interface 103, a system bus 104, an input device 105, an output device 106, a display 107, a storage 108, and a communication device 109.

The processor 101 is a processing device that performs arithmetic processing for implementing each function by using programs and data which are stored in the memory 102. The memory 102 stores programs executed by the processor 101 and data necessary for executing each of the programs. The input/output interface 103 is a device for interfacing between various kinds of hardware and a system bus 104. The system bus 104 is an information transmission path shared by the processor 101, the memory 102, and the input/output interface 103.

To the input/output interface 103, hardware such as the input device 105, the output device 106, the display 107, the storage 108, and the communication device 109 is connected. The input device 105 is a keyboard, a mouse, or the like operated by an operator. The output device 106 is an external storage terminal. The display 107 displays the data confirmation screen shown in FIG. 2. The storage 108 is a large-capacity auxiliary storage device that stores programs and data: for example, a hard disk device and a nonvolatile semiconductor memory. The communication device 109 includes a connector for connecting to the control network 10 and a connector for connecting to the monitoring network 20 and can communicate with devices which are connected to the networks.

Function Block Diagram of Data Collector

Figure 4:
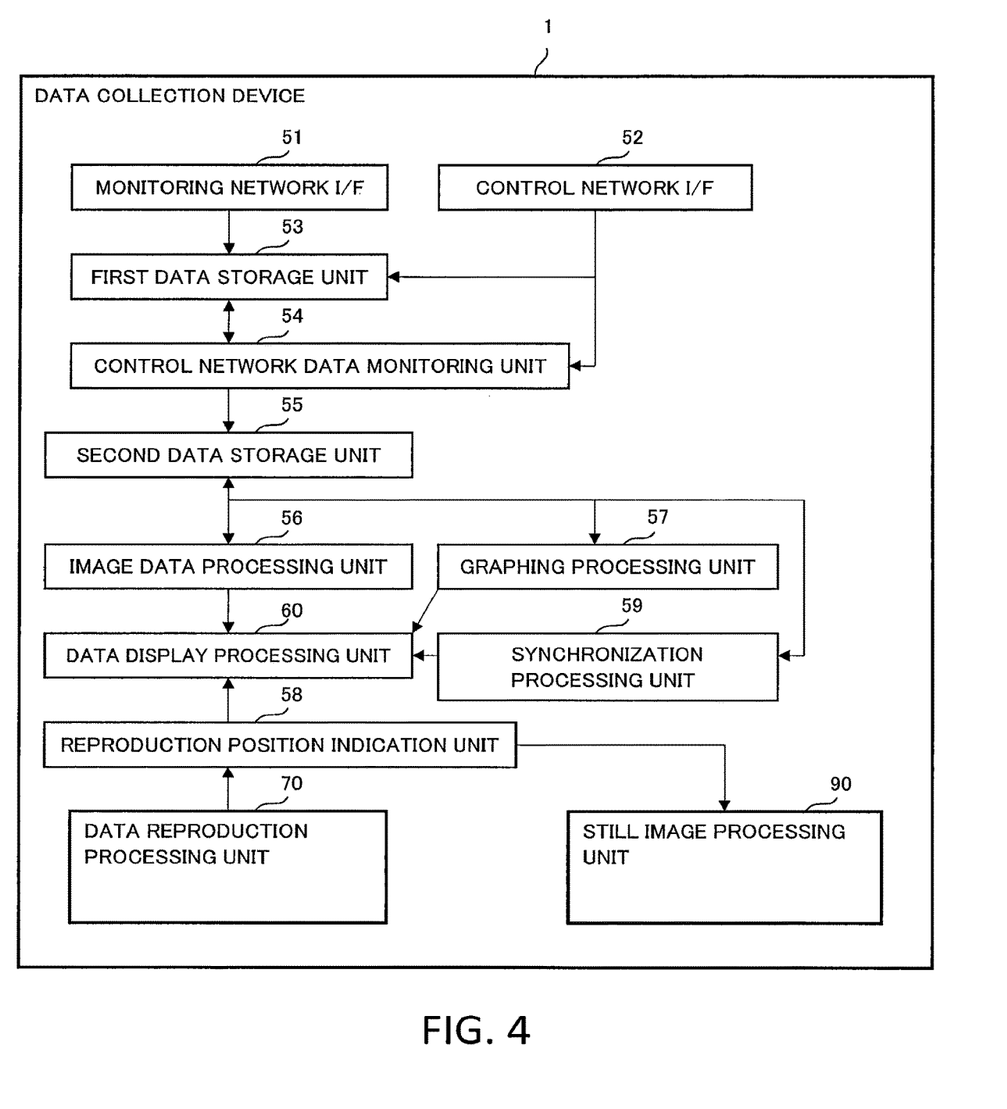
FIG. 4 is a function block diagram of the data collector.

FIG. 4 is a function block diagram of the data collector 1. The data collector 1 includes a monitoring network I/F 51, a control network I/F 52, a first data storage unit 53, a control network data monitoring unit 54, a second data storage unit 55, an image data processing unit 56, a graphing processing unit 57, a reproduction position indication unit 58, a synchronization processing unit 59, a data display processing unit 60, a data reproduction processing unit 70, and a still image processing unit 90.

The monitoring network I/F 51 obtains field device video data and monitoring screen video data from the monitoring network 20 via the communication device 109 shown in FIG. 3.

The control network I/F 52 obtains control network data from the control network 10 via the communication device 109 shown in FIG. 3.

The first data storage unit 53 stores, in the memory 102 or storage 108 shown in FIG. 3, the field device video data, monitoring screen video data, and control network data which are obtained by the monitoring network I/F 51 and control network I/F 52. A collection time is associated with each piece of the data.

The control network data monitoring unit 54 monitors a state change of the control network data obtained by the control network I/F 52. For example, when a predetermined parameter value included in the control network data exceeds a set value, or when the change rate of the predetermined parameter value exceeds the set change rate, it can be determined that a state change has occurred.

The second data storage unit 55 stores, when it is determined that a state change has occurred, the field device video data, monitoring screen video data, and control network data in a predetermined period before or after a timing of the occurrence of the state change. For example, the data is stored in the memory 102 or storage 108 shown in FIG. 3. A collection time is associated with each piece of the data.

The image data processing unit 56 performs processing for reproducing as video each of the field device video data and monitoring screen video data which are stored in the second data storage unit 55, in the image display part 31 shown in FIG. 2.

The graphing processing unit 57 performs processing for displaying as a time-series graph the control network data stored in the second data storage unit 55, in the PLC input/output data display part 32 shown in FIG. 2.

The reproduction position indication unit 58 sets the reproduction position indicator 37 that is displayed in the PLC input/output data display part 32 shown in FIG. 2. The reproduction position indicator 37 is controlled by the data reproduction processing unit 70 described later. The reproduction position indicator 37 indicates the current reproduction position of the control network data and also indicates the current reproduction position of the field device video data and monitoring screen video data which are displayed as video in the image display part 31.

The synchronization processing unit 59 synchronizes the control network data and monitoring screen video data by adding a delay time due to transmission through the monitoring network 20, which includes an encoding time spent by the video capturer 4, to the time at which the control network data has been collected. Concretely, after a delay time has passed since the time at which the control network data has been collected, monitoring screen video data corresponding to the control network data at the collection time is collected. Accordingly, the monitoring screen video data which is collected behind the time at which the control network data has been collected, by the delay time, is associated to the control network data, thereby allowing these pieces of data to be synchronized.

Similarly, the synchronization processing unit 59 synchronizes the control network data and field device video data by adding a delay time due to transmission through the monitoring network 20 to the time at which the control network data has been collected.

The data display processing unit 60 reproduces and displays, on the data confirmation screen 30, the control network data, monitoring screen video data, and field device video data that are synchronized by the synchronization processing unit 59. Concretely, in the PLC input/output data display part 32 shown in FIG. 2, the control network data is displayed as a time-series graph (graphing processing unit 57). The data display processing unit 60 sequentially obtains the reproduction position indicator 37 from the reproduction position indication unit 58 and displays the reproduction position indicator 37 indicating the current reproduction position, on the time-series graph. In addition, in the image display part 31 shown in FIG. 2, the monitoring screen video data and field device video data which correspond to the current reproduction position are displayed as video (image data processing unit 56). At this time, the control network data, monitoring screen video data, and field device video data are synchronously displayed by the synchronization processing unit 59. That is, each piece of the video data displayed in the image display part 31 shown in FIG. 2 is video data at the collection time which is obtained by adding the above-described delay time to the time at which the control network data indicated by the reproduction position indicator 37 has been collected.

Further, since the data display processing unit 60 displays, on the data confirmation screen 30, each kind of data corresponding to the reproduction position indicator 37, the display contents on the data confirmation screen 30 are also updated every time the reproduction position indicator 37 is updated by the reproduction position indication unit 58.

Figure 5:
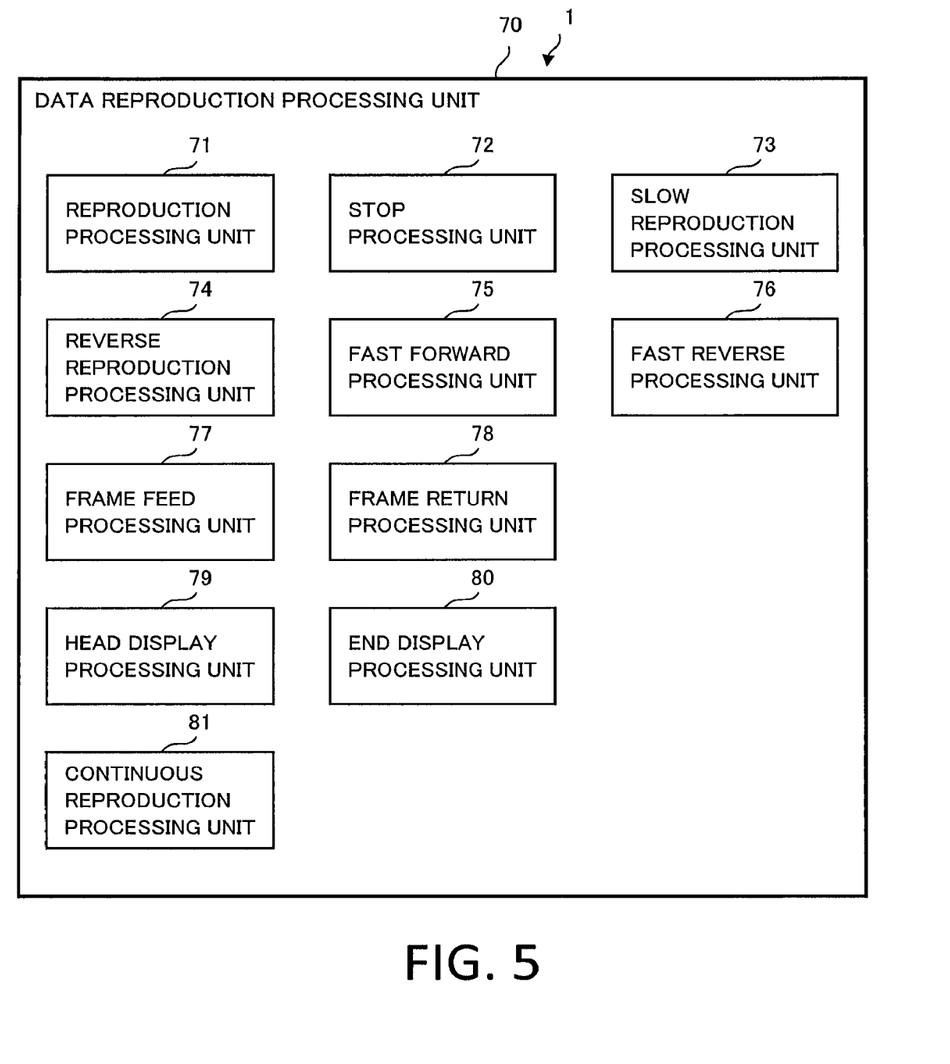
FIG. 5 is a function block diagram of a data reproduction processing unit of the data collector.

FIG. 5 is a function block diagram of the data reproduction processing unit 70 of the data collector 1. The data reproduction processing unit 70 includes a reproduction processing unit 71, a stop processing unit 72, a slow reproduction processing unit 73, a reverse reproduction processing unit 74, a fast forward processing unit 75, a fast reverse processing unit 76, a frame feed processing unit 77, a frame return processing unit 78, a head display processing unit 79, an end display processing unit 80, and a continuous reproduction processing unit 81. By these processing units, the reproduction position indicator 37 in the reproduction position indication unit 58 is controlled.

The reproduction processing unit 71 advances, in response to pressing of the reproduction button 38 shown in FIG. 2, the reproduction position indicator 37 in the reproduction direction with time.

The stop processing unit 72 stops, in response to pressing the stop button 39 shown in FIG. 2, the reproduction position indicator 37 during reproduction.

The slow reproduction processing unit 73 advances, in response to pressing of the slow reproduction button 40 shown in FIG. 2, the reproduction position indicator 37 in the reproduction direction at a slower speed than in the reproduction processing unit 71.

The reverse reproduction processing unit 74 advances, in response to pressing the reverse reproduction button 41 shown in FIG. 2, the reproduction position indicator 37 in the reverse reproduction direction.

The fast forward processing unit 75 advances, in response to pressing of the fast forward button 42 shown in FIG. 2, the reproduction position indicator 37 in the reproduction direction at a higher speed than in the reproduction processing unit 71.

The fast reverse processing unit 76 advances, in response to pressing of the fast reverse button 43 shown in FIG. 2, the reproduction position indicator 37 in the reverse reproduction direction at a higher speed than in the reverse reproduction processing unit 74.

The frame feed processing unit 77 advances, in response to pressing of the frame feed button 44 shown in FIG. 2, the reproduction position indicator 37 in the reproduction direction frame by frame.

The frame return processing unit 78 advances, in response to pressing of the frame return button 45 shown in FIG. 2, the reproduction position indicator 37 in the reverse reproduction direction frame by frame.

The head display processing unit 79 moves, in response to pressing the head display button 47 shown in FIG. 2, the reproduction position indicator 37 to the head of data.

The end display processing unit 80 moves, in response to pressing of the end display button 46 shown in FIG. 2, the reproduction position indicator 37 to the end of data.

The continuous reproduction processing unit 81 automatically moves, in response to pressing the continuous reproduction button 48 shown in FIG. 2, the reproduction position indicator 37 to the head of the data when the reproduction position indicator 37 has moved to the end of data, and advances it from the head of the data toward the reproduction direction.

Figure 6:
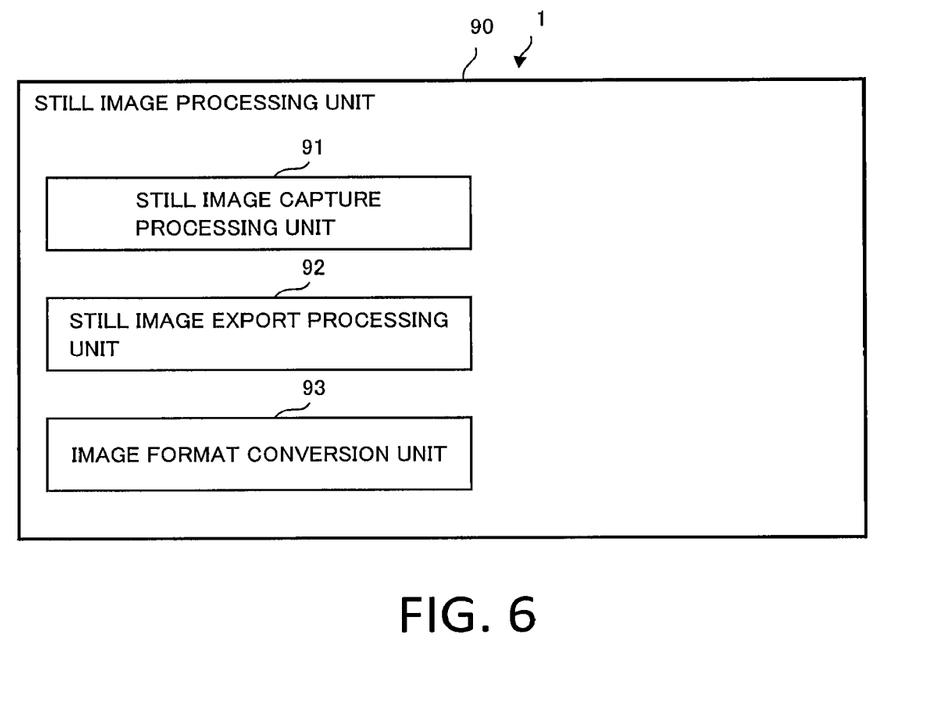
FIG. 6 is a function block diagram of a still image processing unit of the data collector.

FIG. 6 is a function block diagram of the still image processing unit 90 of the data collector 1. The still image processing unit 90 includes a still image capture processing unit 91, a still image export processing unit 92, and an image format conversion unit 93.

The still image capture processing unit 91 captures video currently being reproduced on the data confirmation screen 30 and creates a still image.

The still image export processing unit 92 exports the still image created by the still image capture processing unit 91 to an external storage terminal (output device 106).

The image format conversion unit 93 converts, in exporting the still image to the external storage terminal by the still image export processing unit 92, the image format of the still image into a predetermined format (e.g. JPEG).

Effects

As described above, the data collector according to the present embodiment allows the control network data relating to control of the field device constituting the plant and the monitoring screen video data including operating information for the entire plant facility other than the control network data to be synchronously reproduced. In addition, it also includes the functions of "stop," "slow reproduction," "reverse reproduction," "repetitive reproduction," "frame feed," "frame return," "fast reverse," "fast forward," "head display," and "end display." Therefore, when an abnormality occurs or a mechanical adjustment is performed, analysis of the plant operating state can be supported by using the data collector that is closer to a worksite than the monitor. Facilitation of grasping the operating state of the plant improves the speed of analyzing an abnormality factor, thereby allowing a recovery time at the time of abnormality occurrence to be reduced. Due to a reduction in the recovery time, a reduction in labor costs relating to trouble settlement and an increase in production volume can be expected.

In addition, the data collector according to the present embodiment allows screen information (monitoring screen video data) of the monitor to be stored as a still image. The still image can be used as an evidence of an analysis result. Further, also when a similar trouble occurs or a mechanical adjustment is performed, improvement in productivity and quality can be expected by referencing these evidences.

The plant operating state analysis system according to the present embodiment allows a relationship between operation and control to be grasped in a data collector on a worksite and therefore, can improve efficiency in troubleshooting and mechanical adjustment procedures when an abnormality occurs or a mechanical adjustment is performed; thereby allowing improvement in quality and improvement in productivity to be expected.

Modified Example

The system of the first embodiment described above has a configuration that includes the network camera 3; however, the system may have a configuration that does not include the network camera 3. In addition, the control network 10 is not limited to the concrete example shown in FIG. 1 and may be a network to which other line concentration devices and cables are further connected. The same applies to the monitoring network 20. In addition, the data collector 1 may have a configuration that does not include the still image processing unit 90. In this regard, the same applies to the second embodiment.

Second Embodiment

Next, with reference to FIG. 7 to FIG. 8, the second embodiment of the present disclosure will be described.

According to the first embodiment described above, in the data collector 1, a delay time due to transmission through the monitoring network 20, which includes an encoding time spent by the video capturer 4, is added to the time at which the control network data has been collected, thereby synchronizing the control network data and monitoring screen video data. However, a method for synchronizing the control network data and monitoring screen video data is not limited to this. Thus, in the second embodiment, the control network data and monitoring screen video data are synchronized by using another method.

Figure 7:
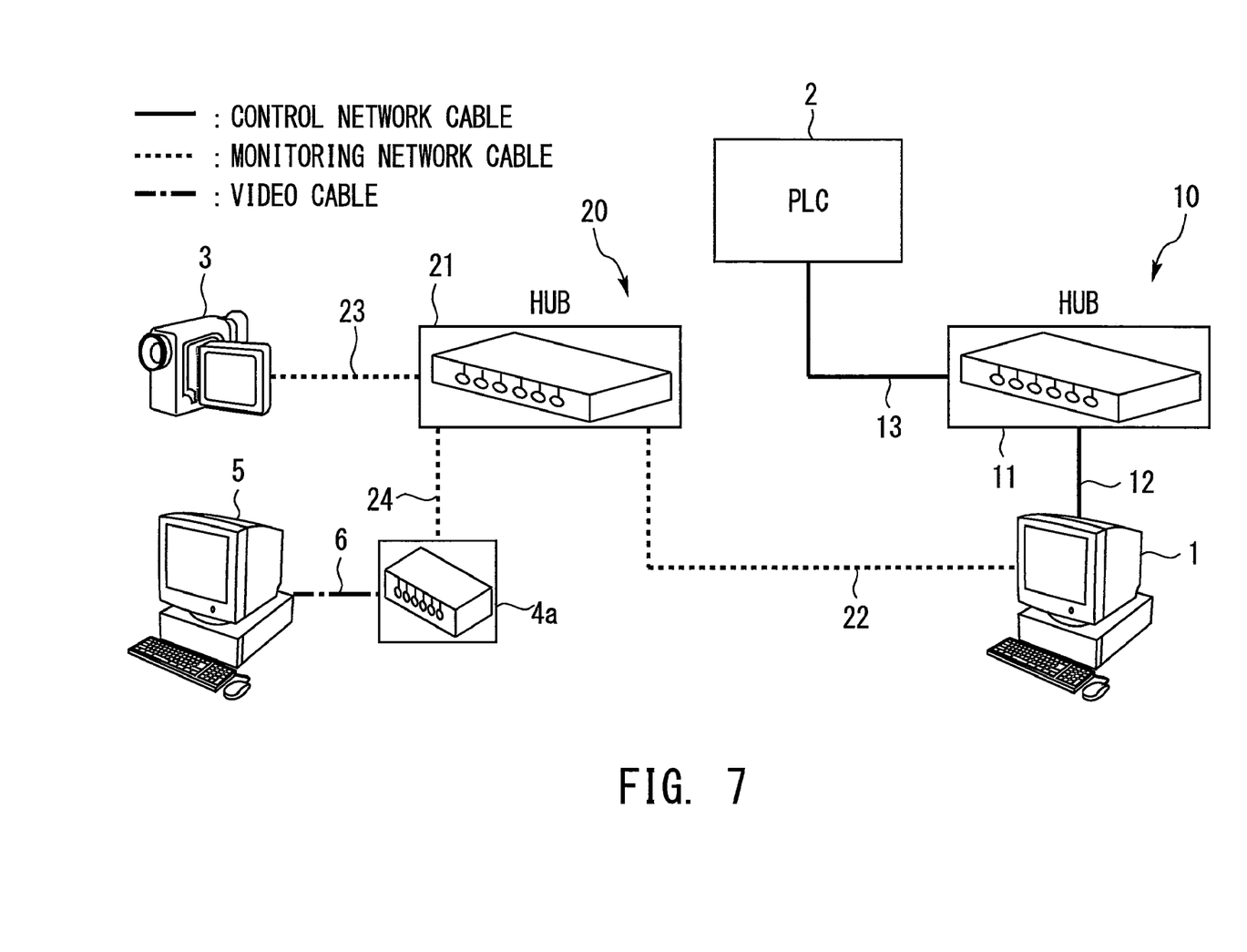
FIG. 7 is a system configuration diagram of a plant operating state analysis system according to the second embodiment of the present disclosure.
Figure 8:
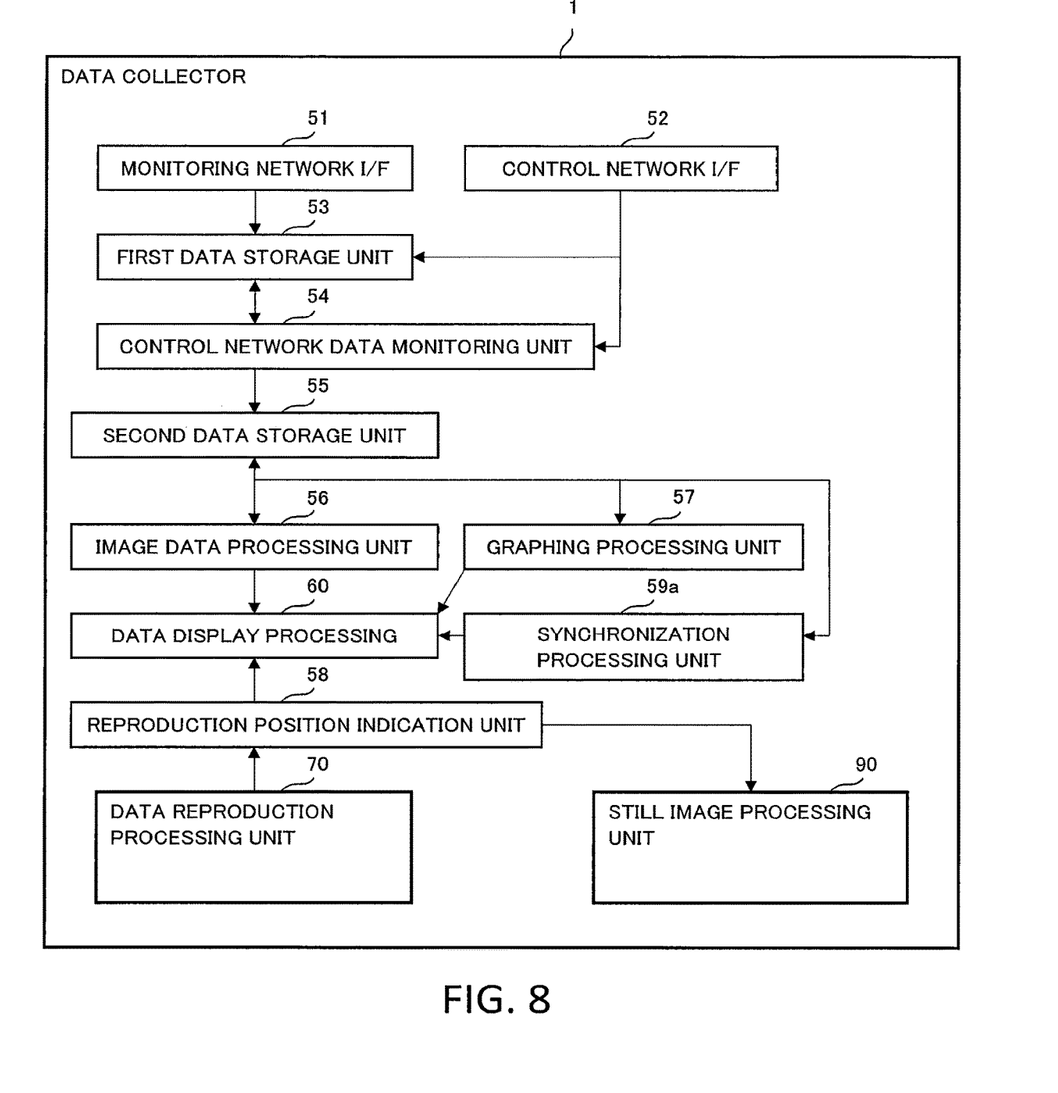
FIG. 8 is a function block diagram of a data collector according to the second embodiment of the present disclosure.

FIG. 7 is a system configuration diagram of a plant operating state analysis system according to the second embodiment of the present disclosure. FIG. 8 is a function block diagram of a data collector according to the second embodiment of the present disclosure. The system configuration shown in FIG. 7 is the same as the system configuration shown in FIG. 1 except that the video capturer 4 is replaced with a video capturer 4a. In addition, the configuration shown in FIG. 8 is the same as the configuration shown in FIG. 4 except that the synchronization processing unit 59 is replaced with a synchronization processing unit 59a. Therefore, the same reference sign is used for the same configurations, and description thereof is omitted.

Video Capturer

The video capturer 4a is connected to the monitor 5 by a video cable 6 (for example, HDMI (R) cable) and has a function of obtaining an input time at which video has been input from the monitor 5. The video capturer 4a sequentially outputs monitoring screen video data, which is obtained by encoding video displayed on the monitoring screen of the monitor 5, with the input time at which the video has been input being added (for example, in units of one frame), to the monitoring network 20.

When TCP/IP is used as a communication protocol of the monitoring network 20, the input time may be included in a data part of a packet together with monitoring screen video data, or the input time may be included in an option part of a packet IP header. The same applies to field device video data which is output by the network camera 3.

Data Collector

The synchronization processing unit 59a of the data collector 1 synchronizes the control network data and monitoring screen video data by associating both the data pieces with each other so as to match the time at which the control network data 10 has been collected and the input time which has been added to the monitoring screen video data. The input time which has been added to the monitoring screen video data represents the time at which video has been displayed on the monitoring screen of the monitor 5; and is a time which has not been affected by a delay due to encoding and transmission through the monitoring network 20. Thus, control network data and monitoring screen video data can be synchronized by associating these data pieces with each other so as to match this input time and the time at which the control network data 10 has been collected.

As described above, in the plant operating state analysis system according to the second embodiment, effects similar to those in the system according to the first embodiment can be obtained. That is, in the data collector 1 on a worksite, the control network data relating to control of the field device constituting the plant and the monitoring screen video data including operating information for the entire plant facility other than the control network data can be synchronously reproduced. Thus, analysis of the operating state of the plant can be supported on the worksite.

REFERENCE SIGNS LIST

1 Data collector
2 Control PLC
3 Network camera
4, 4a Video capturer
5 Monitor
6 Video cable
10 Control network
11 Control network line concentration device
12, 13 Control network cable
20 Monitoring network
21 Monitoring network line concentration device
22-24 Monitoring network cable
30 Data confirmation screen
31 Image display part
32 PLC input/output data display part
33 Data reproduction operation part
34 Still image display part
35 Monitoring screen video display area
36 Camera video display area
37 Reproduction position indicator
38 Reproduction button
39 Stop button
40 Slow reproduction button
41 Reverse reproduction button
42 Fast forward button
43 Fast reverse button
44 Frame feed button
45 Frame return button
46 End display button
47 Head display button
48 Continuous reproduction button
49 Still image capture button
50 Redisplay button for still image creation position
51 Monitoring network I/F
52 Control network I/F
53 First data storage unit
54 Control network data monitoring unit
55 Second data storage unit
56 Image data processing unit
57 Graphing processing unit
58 Reproduction position indication unit
59, 59a Synchronization processing unit
60 Data display processing unit
70 Data reproduction processing unit
71 Reproduction processing unit
72 Stop processing unit
73 Slow reproduction processing unit
74 Reverse reproduction processing unit
75 Fast forward processing unit
76 Fast reverse processing unit
77 Frame feed processing unit
78 Frame return processing unit 79 Head display processing unit
80 End display processing unit
81 Continuous reproduction processing unit
90 Still image processing unit
91 Still image capture processing unit
92 Still image export processing unit
93 Image format conversion unit
101 Processor
102 Memory
103 Input/output interface
104 System bus
105 Input device
106 Output device
107 Display
108 Storage
109 Communication device

The invention claimed is:

1. A plant operating state analysis system, comprising:
a controller configured to control a field device that is an actuator to operate a plant;
a control network connected to the controller and configured to transmit control network data, the control network data including a control signal output from the controller to the field device and a feedback signal input into the controller from the field device;
a monitor having a monitoring screen and configured to display operating information for an operator to operate the plant, the operating information not being included in the control network data;
a video capturer connected to the monitor and configured to output monitoring screen video data obtained by encoding video displayed on the monitoring screen;
a monitoring network connected to the video capturer and configured to transmit the monitoring screen video data, the monitoring network being provided independently of the control network and having a transmission speed lower than a transmission speed of the control network; and
a data collector connected to both the control network and the monitoring network in parallel and configured to collect both the control network data and the monitoring screen video data; wherein
the data collector is further configured to:
synchronize the control network data and the monitoring screen video data by adding a delay time due to transmission through the monitoring network, including an encoding time spent by the video capturer, to a time at which the control network data has been collected; and
replay the control network data and the monitoring screen video data that are synchronized on separate screens with a same replay operation.

2. The plant operating state analysis system according to claim 1, further comprising:
a network camera connected to the monitoring network and configured to photograph an appearance of the field device and output field device video data; wherein
the data collector synchronizes the control network data, the monitoring screen video data, and the field device video data; and
the data collector replays the control network data, the monitoring screen video data, and the field device video data that are synchronized on separate screens with a same replay operation.

3. The plant operating state analysis system according to claim 1, wherein
the data collector is further configured to capture video currently being replayed on the monitoring screen and create a still image.

4. A plant operating state analysis system, comprising:
a controller configured to control a field device that is an actuator to operate a plant;
a control network connected to the controller and configured to transmit control network data, the control network data including a control signal output from the controller to the field device and a feedback signal input into the controller from the field device;
a monitor having a monitoring screen and configured to display operating information for an operator to operate the plant, the operating information not being included in the control network data;
a video capturer connected to the monitor and configured to output monitoring screen video data with an input time added, the monitoring screen video data being obtained by encoding video displayed on the monitoring screen, the input time being a time at which the video has been input;
a monitoring network connected in parallel to the video capturer and configured to transmit the monitoring screen video data, the monitoring network being provided independently of the control network and having a transmission speed lower than a transmission speed of the control network; and
a data collector connected to both the control network and the monitoring network and configured to collect both the control network data and the monitoring screen video data; wherein
the data collector is further configured to:
synchronize the control network data and the monitoring screen video data by associating both the data pieces with each other so as to match a time at which the control network data has been collected and the input time which has been added to the monitoring screen video data; and
replay the control network data and the monitoring screen video data that are synchronized on separate screens with a same replay operation.

5. The plant operating state analysis system according to claim 4, further comprising:
a network camera connected to the monitoring network and configured to photograph an appearance of the field device and output field device video data; wherein
the data collector synchronizes the control network data, the monitoring screen video data, and the field device video data; and
the data collector replays the control network data, the monitoring screen video data, and the field device video data that are synchronized on separate screens with a same replay operation.

6. The plant operating state analysis system according to claim 4, wherein
the data collector is further configured to capture video currently being replayed on the monitoring screen and create a still image.

7. A plant operating state analysis system, comprising:
control circuitry configured to control a field device that is an actuator to operate a plant;
a control network connected to the control circuitry and configured to transmit control network data, the control network data including a control signal output from the control circuitry to the field device and a feedback signal input into the control circuitry from the field device;

a monitor having a monitoring screen and configured to display operating information for an operator to operate the plant, the operating information not being included in the control network data;

video capture circuitry connected to the monitor and configured to output monitoring screen video data obtained by encoding video displayed on the monitoring screen;

a monitoring network connected to the video capture circuitry and configured to transmit the monitoring screen video data, the monitoring network being provided independently of the control network and having a transmission speed lower than a transmission speed of the control network; and data collecting circuitry connected to both the control network and the monitoring network in parallel and configured to collect both the control network data and the monitoring screen video data; wherein the data collecting circuitry is further configured to:

synchronize the control network data and the monitoring screen video data by adding a delay time due to transmission through the monitoring network, including an encoding time spent by the video capture circuitry, to a time at which the control network data has been collected; and replay the control network data and the monitoring screen video data that are synchronized on separate screens with a same replay operation.

* * * * *